United States Patent
Wietelmann et al.

(10) Patent No.: US 6,984,367 B2
(45) Date of Patent: Jan. 10, 2006

(54) PROCESS FOR THE PREPARATION OF LITHIUM IODIDE SOLUTIONS

(75) Inventors: Ulrich Wietelmann, Friedrichsdorf (DE); Uwe Lischka, Frankfurt am Main (DE)

(73) Assignee: Chemetall GmbH, Frankfurt am main (DE)

( * ) Notice: Subject to any disclaimer, the term of this patent is extended or adjusted under 35 U.S.C. 154(b) by 25 days.

(21) Appl. No.: 10/465,531

(22) Filed: Jun. 19, 2003

(65) Prior Publication Data

US 2004/0033191 A1 Feb. 19, 2004

(30) Foreign Application Priority Data

Jun. 24, 2002 (DE) ................................ 102 28 201

(51) Int. Cl.
*C01D 15/04* (2006.01)
(52) U.S. Cl. .................. 423/499.1; 429/199; 429/337; 429/341
(58) Field of Classification Search ................ 429/199, 429/337, 341; 423/499.1
See application file for complete search history.

(56) References Cited

U.S. PATENT DOCUMENTS

| 4,267,244 A | * | 5/1981 | Louzos ........................ 429/213 |
| 4,302,432 A | * | 11/1981 | Polichnowski .............. 423/487 |
| H829 H | * | 10/1990 | Behl ........................... 429/337 |
| 5,487,959 A | * | 1/1996 | Koksbang .................... 429/310 |
| 6,218,054 B1 | | 4/2001 | Webber |
| 6,475,680 B1 | * | 11/2002 | Arai et al. ................... 429/340 |

FOREIGN PATENT DOCUMENTS

WO    WO 9314246 A1 *  7/1993

* cited by examiner

*Primary Examiner*—Ngoc-Yen Nguyen

(74) *Attorney, Agent, or Firm*—Fulbright & Jaworski L.L.P.

(57) ABSTRACT

A process is described for the preparation of lithium iodide solutions by reacting a lithium-containing substance with elemental iodine, the lithium iodide being prepared in an aprotic solvent that can be used as a solvent in a liquid electrolyte solution.

18 Claims, No Drawings

PROCESS FOR THE PREPARATION OF LITHIUM IODIDE SOLUTIONS

The invention relates to a process for the preparation of lithium iodide solutions.

The lithium batteries currently in use (both primary and secondary battery cells) normally contain anhydrous, liquid ion-conducting electrolytes in which conducting salts, such as $LiPF_6$, $LiClO_4$, lithium imides, lithium borates or lithium iodide, are present in dissolved form. The solvents used are typically carbonates (e.g. ethylene carbonate, dimethyl carbonate), carboxylic acid esters, lactones and/or ethers, in each case individually or as a mixture.

Lithium iodide can be used as an electrolyte in non-aqueous batteries Because of its limited stability to oxidation, this salt can only be used for electrochemical cells with a cell voltage of up to 2 V. Conventional systems contain e.g. iron sulfide cathodes and lithium metal anodes. The liquid electrolyte used must have a sufficiently high conductance (at least $10^{-4}$ mS/cm) and a sufficiently high resistance to the active materials used. For this purpose U.S. Pat. No. 6,218,054 proposes solutions of lithium salts, e.g. lithium iodide, in a mixture of 1,3-dioxolane and 1,2-dimethoxyethane Such liquid electrolytes are normally prepared by dissolving solid anhydrous lithium iodide in the desired solvent mixture. One disadvantage of this process is that it involves several stages:
- preparation of solid lithium iodide
- after-drying to a very low water content (e.g. <100 ppm)
- dissolution in the desired solvent (solvent mixture)
- after-conditioning of the liquid electrolyte (drying, filtration)

The costs of such a multistage process are relatively high.

Another disadvantage of this common process is that the lithium iodide grades suitable for use in non-aqueous electrolytes cannot easily be obtained by the evaporation of aqueous lithium iodide solutions. This is because a monohydrate crystallizes from aqueous solution and this monohydrate cannot be dried without hydrolytic decomposition according to:

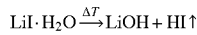

The lithium hydroxide, LiOH, formed in the decomposition is not acceptable as an impurity in lithium iodide for battery electrolytes because it would interfere in the electrochemical cell but is difficult to separate off. Moreover, products contaminated with LiOH only dissolve slowly and incompletely in organic solvents The lithium iodide must therefore be synthesized in the absence of water. Such a process consists in reacting lithium hydride with iodine in diethyl ether.(M. D. Taylor and L. R. Grant, J. Am. Chem. Soc. 77 (1955) 1507–1508) according to:

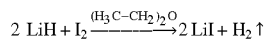

A disadvantage of this process is that, because of the very low boiling point of diethyl ether (35° C.) and the correspondingly high vapour pressure, expensive provisions have to be made for handling this substance safely. Also, the hydrogen gas formed in this process is saturated with solvent, the resulting solvent loading in the hydrogen gas being correspondingly high because of the high volatility of diethyl ether.

In the synthesis described by Taylor and Grant, the two reactants present as solids (LiH powder and iodine) are premixed. The reaction is then started by adding diethyl ether in portions. The high exothermicity of the reaction and the evolution of gas are such that this procedure is not without danger when transferred to a larger (industrial) scale (so-called batch procedure).

The object of the present invention is to provide a process for the preparation of lithium iodide which avoids the disadvantages of the state of the art and, in particular, allows the safe cost-effective preparation of pure lithium iodide electrolytes.

The object is achieved by a process in which lithium iodide is prepared by reacting a lithium-containing substance with elemental iodine in an aprotic solvent that can be used as a solvent in a liquid electrolyte mixture. Directly usable, anhydrous, lithium iodide-containing liquid electrolyte solutions are obtained in this way.

Suitable aprotic solvents are those which are sufficiently stable in lithium batteries and sufficiently resistant to lithium metal or lithium hydride and to iodine. It is preferable to use cyclic or open-chain difunctional or polyfunctional ethers, carbonates (=carbonic acid esters), carboxylic acid esters or lactones (especially γ-lactones such as γ-butyrolactone), or mixtures thereof.

The preferred ethers include especially dioxolanes and glycol ethers (glymes of the general formula

where $R^1$ and $R^2$ independently of one another are $CH_3$, $C_2H_5$ or $C_4H_9$ and n=1 to 50). The preferred carbonates include ethylene carbonate (EC), propylene carbonate (PC), butylene carbonate (BC), vinylene carbonate (VC), dimethyl carbonate (DMC), diethyl carbonate (DEC), dipropyl carbonate (DPC), ethyl methyl carbonate (EMC), methyl propyl carbonate (MPC), butyl methyl carbonate (BMC), ethyl propyl carbonate (EPC) and butyl ethyl carbonate (BEC). The preferred carboxylic acid esters include ethyl acetate and butyl acetate. The following solvents are very particularly preferred:

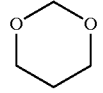
1,3-dioxolane

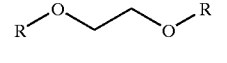
1,2-dimethoxyethane (R = Me)
1,2-diethoxyethane (R = Et)

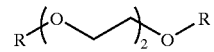

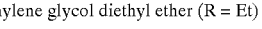
diethylene glycol dimethyl ether (R = Me)
diethylene glycol diethyl ether (R = Et)

The lithium-containing substance used is preferably lithium metal or lithium hydride.

The process is preferably carried out by placing the lithium metal or lithium hydride in the solvent and metering the iodine in as a solid. This prevents elemental iodine from being able to react with the solvent. It is also possible, however, to meter in a solution of iodine in the solvent. A further possibility, in principle, is to place the iodine in the solvent and meter in the lithium raw material.

The reactions according to:

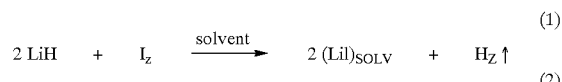

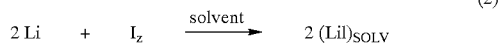

are strongly exothermic, the reaction rate being substantially dependent on the degree of distribution (i.e. the particle size distribution) of the lithium component.

The lithium metal or lithium hydride can be used in a coarse to very fine form. It is preferable to use powder with a particle size of 10 to 500 μm or granules with a particle size of 0.5 to 10 mm. If coarse material is used, the reaction sometimes takes several hours (completion being recognizable by decolorization of the solution). In this case a particularly preferred variant consists in introducing a small amount (e.g. 1 to 10% of the total amount of lithium raw material used) of pulverulent, i.e. very reactive, lithium metal or lithium hydride towards the end of the reaction. This has the effect of substantially shortening the final phase of the reaction.

For lithium iodide solutions to be usable in electrochemical applications, a minimum content of free iodine is a decisive factor because the reactivity of $I_2$ is such that it would attack and corrode battery constituents. For this reason the lithium component is preferably used in excess, particularly preferably in an excess of 1 to 100 mol % and very particularly preferably of 3 to 20 mol %. An excess is also advisable especially in cases where relatively coarse lithium raw materials, i.e. those with small specific surface areas, are used. As the reaction rate is a function of the surface area of the insoluble lithium raw material, a doubling of the amount of lithium raw material, for example, can achieve a proportional acceleration of the reaction.

Preferably, the batch concentration is chosen so as to give a 5 to 30 wt. % solution of lithium iodide in the aprotic solvent.

Possible reaction temperatures lie in the range in which the solvents are liquid, i.e. approx. −20 to 150° C. However, to avoid solvent losses due to the gas stream according to reaction (1) and possible secondary reactions between lithium and/or iodine on the one hand and solvent on the other, the reaction is preferably carried out with cooling in the temperature range from −20 to 100° C., particularly preferably from 0 to 60° C.

Under the preferred temperature conditions, the metered addition of the iodine takes place within about 10 minutes to 5 hours. In the case of reaction (1), the progress of the reaction can conveniently be monitored via measurement of the evolution of gas. Also, the end point is easily recognizable by decolorization of the reaction mixture when all the iodine has reacted, the brown colour of the dissolved elemental iodine disappears Another suitable way of monitoring the reaction, for both reaction variants (1) and (2), consists in measuring the electrical conductance of the reaction solution. The very low initial conductance of <0.05 mS/cm increases proportionally to the LiI concentration as the reaction proceeds.

The reaction is preferably carried out with the exclusion of light so that undesirable photoinduced free radical reactions between iodine and solvent can be suppressed.

Because of the sensitivity of iodide solutions to oxidation (reformation of elemental iodine), the reaction is preferably carried out with the exclusion of air and, in particular, oxygen, i.e. under inert gas. In the case where lithium hydride is used as the lithium raw material, nitrogen is a suitable example of an inert gas. If lithium metal is used as the lithium raw material, a noble gas, preferably argon, is used.

When the reaction is complete (recognizable e.g. by decolorization of the reaction mixture), the excess lithium raw material and any other insoluble by-products can be quantitatively removed relatively inexpensively by means of a solid/liquid separation operation, i.e. filtration, decantation or centrifugation.

The advantages of the process according to the invention are in particular that the hazardous handling of diethyl ether is avoided, the isolation of the hygroscopic solid lithium iodide is avoided and the process takes place in one stage and yields a pure anhydrous lithium iodide solution in an aprotic, electrochemically stable solvent.

A further advantage of the process according to the invention is that the lithium iodide solutions are dried extremely well by the lithium raw material because both lithium hydride and lithium metal react rapidly and irreversibly with traces of moisture according to:

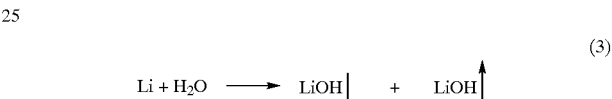

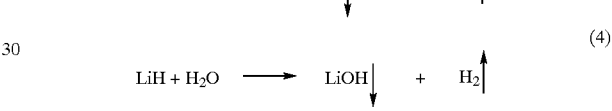

The by-products formed do not detract from the quality of the product because they either escape as gas or are completely insoluble and are quantitatively separated off in the solid/liquid separation.

A very particular advantage of the process is therefore that no high-purity solvents have to be used to prepare the electrolyte, it being possible to use markedly less expensive grades with a higher water content (e.g. of 0.1 to 0.5%).

The lithium iodide solution prepared by the process according to the invention is used as an electrolyte in electrochemical cells or as a reagent in organic synthesis, e.g. for opening epoxides to give β-halogenohydrins, for cleaving ethers or as additives for reactions catalyzed by palladium.

The subject of the invention will be illustrated in greater detail by the Examples which follow:

EXAMPLE 1

Preparation of a 29% Lithium Iodide Solution in 1,3-dioxolane from Lithium Hydride and Iodine A 500 ml glass reactor with glass metering bulb, reflux condenser and conductance cell was dried and rendered inert with argon. 11.9 g (1.50 mol) of LiH granules in 315 g of anhydrous 1,3-dioxolane were placed in the glass reactor and heated to 40° C. The lithium hydride was used as dust-free granules with a particle size of 1 to 5 mm.

Iodine in the form of flakes (134.1 g, 1.06 mol) was metered in over 80 minutes in 6 portions. A strongly exothermic reaction set in immediately after the iodine was added. The temperature difference between the cooling jacket and the inside of the reactor was up to 20° C. 8.8 l of H$_2$ (approx. 70% of theory) had evolved when the addition was complete and 12.9 l (102% of theory) had evolved half an hour later. The solution was still brownish. 0.3 g (40 mmol) of LiH powder was metered in to convert the last residues of iodine. This produced a further 300 ml of gas and the solution became substantially decolorized within 10 minutes to give a pale yellow solution. The conductance of the solution increased from an initial value of <1 µS/cm to a final value of 5 mS/cm. In each of the individual additions of iodine, the conductance reached a relative maximum and then fell back to a lower value. The conductance fluctuated greatly because of the inhomogeneity of the reaction mixture.

Excess lithium hydride was separated from the clear, very pale yellow solution by filtration on a G3 frit and rinsed with 26 g of dioxolane.

| Analysis (mmnol/g) | | |
| --- | --- | --- |
| Li | I° | I⁻ |
| 2.15 | n.d. | 2.14 | n.d. = not detectable
Water content: 50 ppm (Karl Fischer titration)

The yield of LiI calculated from these data is 95% of theory.

EXAMPLE 2

Preparation of a 20% LiI Solution in 1,2-dimethoxyethane from LiH/iodine 1.26 g (167 mmol) of lithium hydride powder (particle size <150 µm) in 80 g (approx. 100 ml) of 1,2-dimethoxyethane were placed in a 0.5 l four-neck flask with reflux condenser, solids metering device and thermocouple, which had been rendered inert with nitrogen. A total of 19.1 g (150 mmol) of iodine was added over 25 minutes, with magnetic stirring. The reaction mixture heated up to max. 52° C. (water bath cooling) with a vigorous evolution of gas. The originally dark brown solution had become completely decolorized about 30 minutes after the end of the metered addition. A solid lithium iodide/1,2-dimethoxyethane complex began to precipitate out.

The solid was redissolved by heating to 70° C. Filtration on a heated glass frit yielded 98 g of a solution which crystallized on cooling. A sample was taken from the hot homogeneous solution and analyzed for lithium and iodine. This was used to calculate an LiI content of 20.1%, i.e. the yield of LiI isolated in the form of the solution was 98%.

EXAMPLE 3

Preparation of an 8% LiI Solution in 1,2-dimethoxyethane from Lithium Metal Granules/iodine 1.63 g of lithium metal granules (235 mmol, particle size 2 to 3 mm) in 225 g of dimethoxyethane were placed in the apparatus described in Example 2 and heated to 30° C. 19.0 g (150 mmol) of iodine were added over 80 minutes, with stirring. The reaction started (recognizable by the exothermicity) after approx. 20 minutes The heat of reaction released heated the mixture to max. 51° C.

After about 3 hours the reaction was substantially complete (recognizable by the temperature equalization), However, a further approx. 10 hours of stirring at 30° C. were necessary to decolorize the brown reaction mixture.

Yield: 240 g of a yellowish solution containing 8.1% of LiI=97% of theory

What is claimed is:

1. A process for the preparation of a lithium iodide solution by reacting a lithium-containing substance with elemental iodine, wherein the lithium iodide is prepared in at least one aprotic solvent selected from the group consisting of a glycol ether, a carboxylic acid ester, a lactone or a mixture thereof that can be used as a solvent in a liquid electrolyte solution.

2. A process according to claim 1 wherein the aprotic solvent is at least one of a cyclic or open-chain difunctional or polyfunctional glycol ether.

3. A process according to claim 1, wherein the solvent comprises cyclic or open-chain difunctional glycol ether.

4. A process according to claim 1, wherein the solvent contains 1,2-dimethoxyethane, 1,2-diethoxyethane, diethylene glycol dimethyl ether or diethylene glycol diethyl ether.

5. A process according to claim 1, wherein that lithium metal or lithium hydride is reacted with elemental iodine in the aprotic solvent.

6. A process for the preparation of a lithium iodide solution by reacting lithium metal or lithium hydride with elemental iodine, wherein the lithium iodide solution is prepared in an aprotic solvent that can be used as a solvent in a liquid electrolyte solution,
   wherein the lithium metal or lithium hydride is placed in the solvent and the iodine is metered in as a solid or a solution.

7. A process for the preparation of a lithium iodide solution by reacting lithium metal or lithium hydride with elemental iodine, wherein the lithium iodide solution is prepared in an aprotic solvent that can be used as a solvent in a liquid electrolyte solution,
   wherein the lithium metal or lithium hydride is used as a powder with a particle size of 10 to 500 µm or as granules with a particle size of 0.5 to 10 mm.

8. A process for the preparation of a lithium iodide solution by reacting lithium metal or lithium hydride with elemental iodine, wherein the lithium iodide solution is prepared in an aprotic solvent that can be used as a solvent in a liquid electrolyte solution, and
   wherein the lithium metal or lithium hydride is used in an excess of 1 to 100 mol %.

9. A process for the preparation of a lithium iodide solution by reacting lithium metal or lithium hydride with elemental iodine, wherein the lithium iodide is prepared in an aprotic solvent that can be used as a solvent in a liquid electrolyte solution, and
   wherein the lithium metal or lithium hydride is used in an excess of 3 to 20 mol %.

10. A process for the preparation of a lithium iodide solution by reacting a lithium-containing substance with elemental iodine, wherein the lithium iodide is prepared in an aprotic solvent that can be used as a solvent in a liquid electrolyte solution,
    wherein the process yields a 5 to 30 wt. % solution of lithium iodide in the aprotic solvent.

11. A process according to claim 1, wherein the reaction is carried out at temperatures of −20 to 100° C.

12. A process according to claim 11, wherein the reaction is carried out at temperatures of 0 to 60° C.

13. A process according to claim 1, wherein the reaction is carried out with the exclusion of light.

14. A process for the preparation of a lithium iodide solution by reacting a lithium-containing substance with elemental iodine, wherein the lithium iodide is prepared in an aprotic solvent that can be used as a solvent in a liquid electrolyte solution, wherein the reaction is carried out under inert gas.

15. A process for the preparation of a lithium iodide solution by reacting a lithium-containing substance with elemental iodine, wherein the lithium iodide is prepared in an aprotic solvent that can be used as a solvent in a liquid electrolyte solution, wherein excess lithium metal or lithium hydride and other insoluble by-products are separated from the solution.

16. A process according to claim 2, wherein the solvent contains polyfunctional glycol ether.

17. A process for the preparation of a lithium iodide solution by reacting a lithium metal or lithium hydride with elemental iodine, wherein the lithium iodide is prepared in an aprotic solvent that can be used as a solvent in a liquid electrolyte solution, wherein the lithium metal or lithium hydride is used as a powder with a particle size of 10 to 500 $\mu$m or as granules with a particle size of 0.5 to 10 mm.

18. A process for the preparation of a lithium iodide solution by reacting lithium metal or lithium hydride with elemental iodine, wherein the lithium iodide is prepared in an aprotic solvent that can be used as a solvent in a liquid electrolyte solution, wherein the lithium metal or lithium hydride is used in an excess of 1 to 100 mol %.

* * * * *